Sept. 11, 1962 W. A. ALEXANDER 3,054,085
SELF-ORIENTING GEOPHONE
Filed Aug. 25, 1958
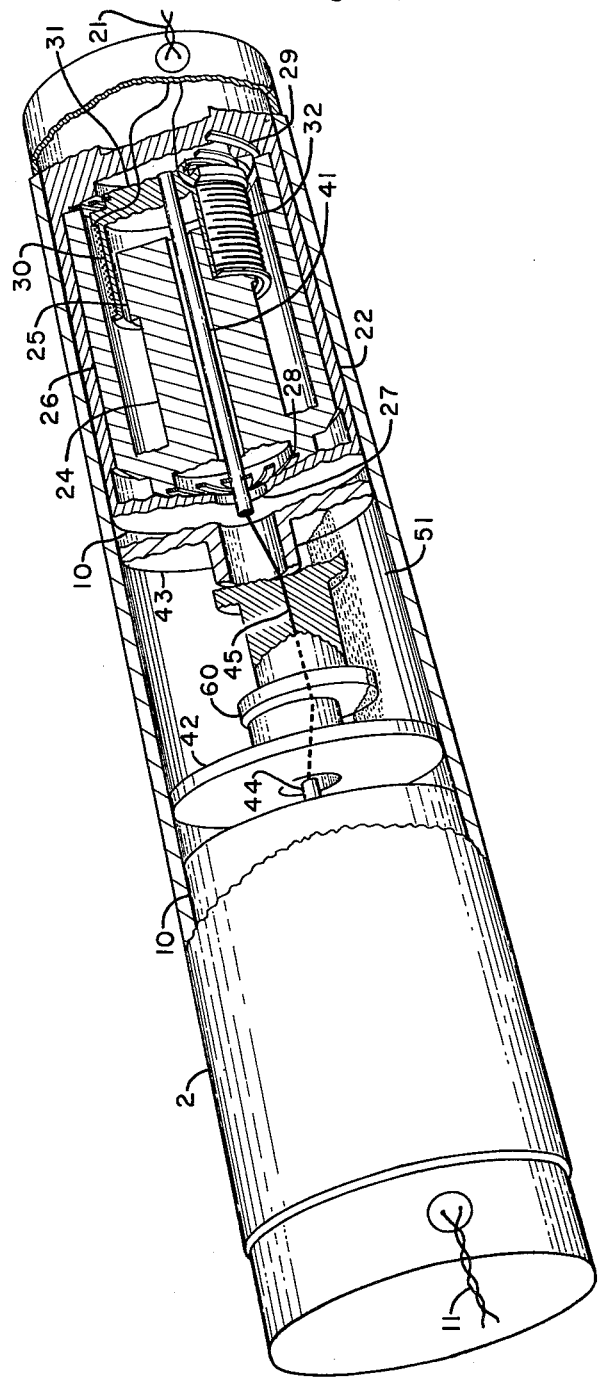
Warren A. Alexander    Inventor
By James A. Reilly    Attorney

3,054,085
SELF-ORIENTING GEOPHONE

Warren A. Alexander, Tulsa, Okla., assignor to Jersey Production Research Company, a corporation of Delaware
Filed Aug. 25, 1958, Ser. No. 757,067
13 Claims. (Cl. 340—17)

This invention relates to vibration sensitive devices and more particularly to a self-orienting vibration detector of high sensitivity which can be easily placed with good ground coupling without the necessity of careful positioning of the device with respect to the plane of the earth's surface.

Electrical devices for recording vibrations and for converting seismic impulses into variable electrical energy are commonly called seismometers, detectors, geophones and the like. The most common of these are the electromagnetic devices of the variable reluctance and dynamic type. An electromagnetic seismometer usually consists essentially of a casing in which is yieldingly suspended, by springs or the like, a moveable mass sometimes called a steady-mass. A winding and means for establishing a magnetic flux through the winding to induce current flow therein are so operatively connected to the casing and the steady-mass that relative displacement of the casing and mass results in variation of the flux to vary the voltages developed in the winding. Consequently, when the seismometer casing is suported on or near the surface of the earth and seismic impulses are propagated in the earth by an explosive charge, these impulses are transmitted to the casing which thus partakes of motion with respect to the steady-mass. This relative motion is thereby converted into electrical energy by reason of the resulting variation in magnetic flux in the seismometer winding.

In the variable reluctance type device variations in magnetic flux are obtained by altering the reluctance of the magnetic circuit. Operation of a dynamic seismometer, on the other hand, depends upon the fact that either the winding or the means for establishing the magnetic field is supported for displacement with respect to the casing. Recently, the most commonly used seismometers have been of the moving coil type in which the position of a coil relative to a magnetic field of substantially constant strength is varied by earth movement causing a cutting of magnetic lines of force by the coil or coils, thus generating electric currents or potentials therein. With either type of instrument the electrical energy is then amplified and recorded in a manner conventional in the art of seismic survey. While applicable with the variable reluctance type of device, the present invention is particularly concerned with seismometers belonging to the last-mentioned group of the electromagnetic type, that is, the dynamic geophones.

In many areas it has been difficult to detect reflected seismic waves in such manner that they may be distinguished from high amplitude random and background noises. This has been the case particularly in areas where subsurface conditions give rise to complex and unintelligible signals. It has been common practice to utilize a great many detectors in such areas in order to suppress, by cancellation, signals that appear to be due to random noise energy but which may be attributed to the disturbed surface and/or subsurface conditions. Where, in accordance with the general practice, one or two geophones per trace would be used, as many as 30 geophones per trace have often been found to be desirable. Accordingly, several hundred individual geophones properly oriented and connected to recording equipment may be required for the recordation of a conventional multiple-trace seismic record.

Heretofore, a major problem involved in the use of such devices in seismic surveying has been the time-consuming, tedious efforts necessary to place each and every vibration detector with good ground connection and in a position where the instrument was properly oriented to insure proper operation. Without extreme precautions to prevent, limit, or retard displacement of its movable parts, a geophone normally becomes inoperative when it is tilted or displaced from a rather restricted operation position.

The present invention is directed to the provision of a detector for seismic surveying apparatus which minimizes the expenditure of time in placing such detector groups or spreads. More particularly a vertically sensitive, self-positioning, geophone assembly is provided which conveniently can be included with or as an integral part of a seismic cable. Because of the self-positioning feature of the novel device, a multiplicity of geophones can be connected along a length of seismic cable which can then simply be dragged to the selected location and dropped to the ground whereupon the geophones instantly orient themselves for reception of seismic waves.

In accordance with the present invention a self-orienting, vibration-sensitive device is provided which comprises in combination, a seismometer of the magnetic type and a weighted member connected thereto which is suspended in a plane perpendicular to the axis of the signal generating winding. The seismometer includes a casing, a magnet assembly, a steady-mass resiliently suspended in the casing for reciprocal movement with respect thereto, and a signal generating coil in which current flow is induced in response to relative motion between the casing and the steady-mass. A weighted member of small mass adapted for rotation about the axis of the coil, is suspended in a plane perpendicular to the axis of the coil from a flexible tensile member, one end of which is connected to the steady-mass within the seismometer casing. More particularly, the present invention provides a self-orienting and self-positioning vibration detector of high sensitivity which utilizes the reciprocal movement of a conventional type dynamic geophone in resopnse to seismic signals. The relative movement in a vertical plane of a small mass, adapted for rotation about the axis of the signal generating coil, is translated to a geophone in the horizontal position by suspending the small mass in a plane perpendicular to the axis of the coil from a flexible tensile member connected to the steady-mass of the geophone.

In one embodiment of the present invention the signal generating coil is supported upon the steady mass for displacement with respect to the seismometer casing. In an alternate embodiment, the means for establishing the magnetic field is supported on the steady-mass.

In a preferred embodiment of the invention the weighted member of small mass is suspended by a flexible tensile member between the coils of a pair of oppositely disposed, conventional-type, geophones which are partially enclosed within a cylindrical housing adapted to form a seal impervious to environmental constituents damaging to electrical components. The reciprocal horizontal movement of each geophone is enabled by the vertical motion of the weighted mass in response to seismic signals. This causes a differential movement of the coils with respect to the balance of the geophones, and thereby results in a generated signal proportional to the vibration of the seismic signal. It is readily apparent that problems associated with proper positioning of vibration-sensitive devices, have been entirely eliminated by the novel structure disclosed. Further, because of the elongated cylindrical construction, good ground connections can easily be obtained.

Further objects and features of the invention will be apparent from the following description taken in connection with the accompanying drawing in which the FIGURE is a perspective view, in partial section of one type of device to which the invention is applied.

In order to facilitate an understanding of the invention the specific embodiment shown in the drawing is hereinafter described in detail. It will nevertheless be understood that restriction of the scope of the invention is not thereby intended and that such changes and alterations are contemplated as would occur to one skilled in the art to which the invention relates.

Referring now to the figure, a detector unit embodying the present invention has been illustrated in diagrammatic form as comprising a cylindrical housing 2 having a pair of oppositly disposed geophones 10 mounted in fixed position at either end. The output of the geophones is supplied through suitable conductors 11 and 21 to an amplifier device for amplification of the electric currents and then to a recording device which may include further amplification, neither device being shown in the drawing.

Referring now particularly to the geophone shown in cross section, it is seen that the geophone comprises a main casing portion 22 preferably formed of brass, or aluminum, or the like. For example, in the vibration detector successfully built in accordance with the present invention, the casing member 22 was formed of aluminum and had an outside diameter of 1⅝ inches and a height or depth of about 1¾ inches thus indicating a relatively small size of the vibration-sensitive device of the present invention. Suitable means are provided to permit the electrical conductors to extend into a chamber defined within the casing 22. A suitable geophone, similar to those depicted in the drawing, is manufactured by Electro-Technical Labs. having model number EVS-2.

The geophones utilized in the specific embodiment of the present invention which has been illustrated in the drawing are the moving coil electromagnetic type in which the moving coil cuts constant lines of force. In the figure there is shown, disposed within the chamber defined within casing 22, a magnetic assembly comprising an annular permanent magnet 24 having a small bore cylindrical hole drilled through its longitudinal axis, a pole piece 25 and a pole ring 26 assembled to define, between portions of the pole piece and pole ring, a uniform annular air gap having substantially uniform lines of force passing therethrough. Specifically, the magnet 24 can be formed, for example, of magnetic material of the type now available on the market and designated commonly by the term "Alnico."

For the purpose of supporting an electrical winding or coil within the air gap defined between the pole piece 25 and pole ring 26 to cut the constant lines of force across the air gap in response to movement of a coil within this air gap, there is provided a suitable coil form, generally designated at 30, comprising a somewhat cup-shaped spool of aluminum or other non-magnetic material designated at 31 with its open end disposed to receive the projection of the magnet pole piece 25. Wound around the outer surface of the cup-shaped spool is an electrical winding or coil 32. The lower end of the cup-shaped spool is provided with a central supporting means having an elongated shaft 41 extending therefrom, which shaft is parallel to the axis of the cylindrical housing 2 and projects through an aperture 27 in the outer casing 22 of the geophone. The coil form 30 is preferably supported from suitable flat disc suspension springs designated as 28 and 29 which have their outer edges respectively disposed on the outer case 22. Thus the entire coil form is resiliently mounted in the geophone casing for reciprocal movement with respect thereto, by being mounted with respect to the casing and retained in balanced position by the weight compensating springs. This coil form assembly functions as an inertia weight or steady-mass. Flexure of the springs allows the coil to move in and out of the annular magnetic gap freely but presents a rather stiff mounting for other modes of action. In conventional operation in the vertical position the inertia of the mass holds the coil motionless while the earth's vibration moves the geophone housing and magnet.

In accordance with the present invention the assembly described thus far comprising a conventional seismometer of the dynamic type is inserted into the open end of the cylindrical housing 2. A similar geophone oppositely disposed is inserted into the opposite end of the housing so that the two geophones are fixed in spaced relation to each other. In view of the relative outside diameters of the geophone casings and the inside diameter of the cylindrical housing, all parts are held in proper position, the ends of the two geophones forming a seal at both ends of the cylindrical housing impervious to gas, water and other normally damaging environmental constituents.

Disposed within the cylindrical housing 2 are two damping fluid retaining plates 42 and 43 each having an outer diameter of the approximate dimension of the inner diameter of the cylindrical housing 2 and each having an aperture at the center surrounded by a raised fluid retaining lip. These damping fluid retaining plates define an inner chamber 51 in which a small mass weighted member 60, adapted for rotation about the axis of the coil 32, is suspended in a plane perpendicular to the axis of the coil from a flexible tensile member 45 which is firmly attached to shafts 41 and 44 which are mounted on the coil form of each geophone. The inner chamber 51 contains a viscous damping fluid which, in the embodiment shown can be for example silicone fluid in which the weighted member 60 is partly immersed.

From the above description it will be apparent that there has been described a very compact vibration detector which utilizes the reciprocal movement of a conventional-type dynamic geophone in response to seismic signals to provide a laterally symmetrical device capable of self-orienting operation. From this detailed description it is believed that the operation of the self-orienting geophone will be apparent to those skilled in the art. When the device, utilized in the horizontal position, is in contact with a vibrating surface or, for example, in contact with the surface of the earth, the vibrations or seismic waves are transmitted to the case and the pair of magnetic assemblies disposed therein. The weighted member suspended in a plane perpendicular to the axis of the coil from the flexible tensile member attached to the shaft extending from the coil in the casing of each geophone remains sensibly stationary in space. Hence, the vibrations received are transmitted by the tensile member to the coil form in which vibrations occur in response to vibrations transmitted thereto. By means of its elongated symmetrical form good ground coupling can easily be obtained by simply placing the cylindrical device on the earth's surface. Moreover, by reason of its symmetrical construction the device is self-positioning. Any portion of the outer circumference of the cylindrical housing can be in contact with the earth. Thus, the device can simply be dropped or rolled out along the surface of the earth and the weighted member suspended in a plane perpendicular to the axis of the housing rotates into a self-oriented operative position.

In the embodiment of the self-orienting, vibration-sensitive device depicted in the drawing, the weighted member is of symmetrical, cylindrical construction and is threaded through its longitudinal axis upon a small diameter flexible tensile member formed of glass and nylon filament. While this is a preferred embodiment, it is understood that it is only necessary that the weighted member be mounted for rotation about the axis of the coil and be suspended in a plane perpendicular to the axis of the coil. The weighted member can be of any shape and preferably should have a weight of about the same magnitude as the moving parts of the laterally disposed geophone or geophones. Specifically, the mass preferably should have a weight approaching that of the coil form, the coil, the shaft extending therefrom and other components associated with these particular members. If the weight of the weighted member appears somewhat too small for best results, tension in the flexible tensile member can be increased, as for example by moving the two geophones laterally away from the weighted member. Accurate adjustments of a geophone assembly of the present invention can be obtained by simply placing the assembly on a shake table side by side with a reference geophone which, for example, can be a standard geophone of the Electro Tech EVS–2A type. The shake table is then driven electrically and the outputs of the standard geophone and the device of the instant invention are compared on an oscilloscope. By selecting a weight for the weighted member and by adjusting the supporting flexible tensile member in the manner just described, two such geophones have been found to give substantially identical wave forms on the scope.

In general, any viscous inert fluid is suitable as a damping fluid. Advantageously, the fluid can be of the silicone type and have a viscosity in the range of 100 to 500 centistokes. It should be viscous enough that it does not splash out over the lips of the retaining plates forming a trap containing the weighted member and the fluid. This flexible tensile member is preferably a string member, though link chains, solid rod linkages, and the like also can be employed. Material suitable for forming this flexible tensile member is radio cord of nylon and glass fibers, fishing line, jointed segments of rigid steel links, piano wire, and the like.

It is understood that vibration sensitive devices fabricated in accordance with the present invention can be placed at specific distances along the length or made an integral part of a seismic cable. Each of the cable lengths containing a number of vibration detectors then can be merely dragged to a selected location and plugged or connected into a truck cable. The devices themselves are automatically and instantly oriented for detection of seismic waves.

It will be apparent that modifications in the self-orienting vibration-sensitive device described and illustrated can be made without changing the fundamentals of operation. For example, a single geophone can be employed in a device in which the weighted member is suspended in a plane perpendicular to the axis of the coil from a flexible tensile member, one end of which is attached to the shaft mounted upon the steady-mass extending from the geophone casing and the other end is attached to a fixed plate within the cylindrical housing or forming one end thereof. In some instances it may be desirable to form the cylindrical housing of a material which reduces the overall density of the device to the point where it will float freely in water. Also, it may be advantageous to utilize other forms of damping, such as air or electromagnetic damping rather than viscous fluid damping. While specific embodiments of the present invention have been described, it will be evident to one skilled in the art that various other changes may be made without departing from the spirit or scope of the invention and is intended to embrace such changes in the appended claims.

What is claimed is:

1. A self-orienting vibration-sensitive device comprising in combination a seismometer of the magnetic type including a casing, mass resiliently suspended in said casing for reciprocal movement with respect thereto, said mass including a signal generating coil in which current flow is induced in response to relative movement between the casing and the mass, a weighted member suspended in a plane perpendicular to said coil for reciprocal movement of said mass with respect to said casing and supported from a flexible tensile member attached to said mass.

2. A self-orienting vibration-sensitive device comprising in combination an electro-magnetic geophone of the dynamic type including a casing having a limited aperture therein, a magnet assembly, a mass resiliently suspended in said casing, said mass having a rigid elongated shaft extending therefrom into said aperture in said casing, said mass being reciprocally movable in said casing along the direction of said shaft, a signal generating coil mounted on said mass, in which coil current flow is induced in response to relative movement between the casing and the mass, and a weighted member adapted for rotation about the axis of said coil and suspended in a plane perpendicular to the axis of said coil from a flexible tensile member attached to said shaft extending from said suspended mass within said casing whereby relative movement between said weighted member and said casing in a first plane causes movement between said coil and said casing in a second plane perpendicular to the first plane.

3. A self-orienting vibration-sensitive device comprising in combination a cylindrical housing, an electromagnetic geophone of the dynamic type disposed within said housing, said geophone including a casing having a limited aperture therein, a mass resiliently suspended in said casing for reciprocal movement with respect thereto along the direction parallel to the axis of said cylindrical housing, said mass having an elongated rigid shaft extending therefrom into said aperture in said casing, a signal generating coil mounted on said mass, in which current flow is induced in response to relative movement between the casing and the mass, and a weighted member adapted for rotation about the axis of said coil suspended from a flexible tensile member attached to said shaft in and capable of having relative movement with said casing whereby relative movement between said weighted member and said casing imparts movement between said mass and said housing, a plane perpendicular to the axis of said coil.

4. A self-orienting vibration-sensitive device comprising in combination a cylindrical housing open at each end, a pair of oppositely inclined electromagnetic geophones of the dynamic type disposed within said housing in spaced relationship with each other and adapted to seal each end of said housing against environmental constituents, each of said geophones including a casing having a limited aperture therein, a mass resiliently suspended in said casing for reciprocal longitudinal movement with respect to said cylindrical housing, said mass having an elongated shaft extending therefrom into said aperture in said casing, a signal generating coil mounted on said mass, in which current flow is induced in response to relative movement between the casing and the mass, and a weighted member adapted for rotation about the axis of said coil suspended in and capable of having relative movement with said cylindrical housing in a plane perpendicular to the axis of said coil from an elongated flexible tensile member attached to the shaft extending from each mass within said casing in such a manner that movement of said mass in a plane perpendicular to the axis of said coil causes reciprocal longitudinal movement between said coil and said cylindrical housing.

5. A device in accordance with claim 1 wherein said weighted member is of symmetrical, cylindrical construction and is threaded upon said flexible string member through its longitudinal axis.

6. A device in accordance with claim 1 wherein said weighted member suspended from said flexible tensile member is partially immersed in a viscous damping fluid.

7. A self-orienting geophone assembly of the electromagnetic dynamic type which includes a magnet and a coil mounted within a case in a manner such that the axis of the coil is laterally resiliently disposed to have lateral reciprocal movement with respect to said magnet when in an operating position, a weighted member suspended from the coil by means of a flexible tensile member and arranged to impart lateral reciprocal movement between said coil and said magnet upon relative movement between said weighted member and said case.

8. A self-orienting geophone assembly including a geophone of the electro-magnetic type having a magnet element and a coil element, one of said elements being movable and the other stationary, which comprises in combination: a casing member, said geophone mounted within said casing member in a manner such that relative movement between said coil and said magnet takes place in a substantially horizontal plane when the seismic detector is in an operating position, resilient means to resist relative movement between said magnet element and said coil element and a weighted member suspended and having vertical movement within said casing member from the movable element of said geophone by means of a flexible string-like member whereby relative movement between said weighted member and said casing member imparts relative movement between said magnet element and said coil element.

9. A self-orienting type geophone assembly including a geophone of the electro-magnetic type having a magnet element and a coil element in movable relation with one another, resilient means to resist movement between said coil element and said magnet element, means to support said geophone such that relative movement between said coil and said magnet occurs in a substantially horizontal plane when the detector is in an operating disposition, a weighted member, supporting means to suspend said member in a plane substantially perpendicular to the plane of relative movement between said coil and said magnet, said supporting means including a flexible tensile member attaching said weighted member to the movable element of said geophone, said supporting means arranged such that relative vertical movement between said weighted member and said geophone imparts horizontal movement between said coil and said magnet.

10. In a seismic detector of the self-orienting type including an electro-magnetic geophone having a magnet element and a coil element with one of said elements being movable relative to the other and resilient means to resist relative movement between said magnet element and said coil element, the improvement which comprises in combination: a casing member of a type to be self-orienting about its longitudinal axis which is horizontally disposed in an operating position, said geophone mounted within said casing member such that relative movement between said magnet and said coil occurs in a direction along said axis, a weighted member, and means including a flexible tensile member attaching said weighted member to the movable element of said geophone to suspend said weighted member within said casing in such a manner that relative vertical movement between said weighted member and said casing imparts horizontal relative movement between said magnet element and said coil element.

11. An apparatus as defined in claim 10 in which the casing member has a longitudinal axis at least about twice the length of its transverse axis.

12. An apparatus as defined in claim 10 in which the casing member has a longitudinal axis sufficiently greater than its transverse axis so as to render the casing member stable about its transverse axis.

13. A self-orienting vibration-sensitive device comprising in combination: a seismometer of magnetic type including a casing, means for having a magnetic field, a signal generating coil resiliently mounted within said casing in which current flow is induced in response to relative reciprocal movement in a first plane of said coil through said magnetic field, a weighted member suspended in a second plane which is perpendicular to the reciprocal movement of said coil in said field, a flexible tensile member means supporting said weighted member from said coil such that movement of said weighted member in said second plane imparts relative movement to said coil in first said plane.

References Cited in the file of this patent

UNITED STATES PATENTS

| | | |
|---|---|---|
| 2,390,187 | Sharpe | Dec. 4, 1945 |
| 2,659,065 | Cordell | Nov. 10, 1953 |
| 2,754,435 | Ongaro | July 10, 1956 |